United States Patent
Menninga

(10) Patent No.: US 7,594,171 B2
(45) Date of Patent: Sep. 22, 2009

(54) RULE-BASED TEXT LAYOUT

(75) Inventor: Eric A. Menninga, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 807 days.

(21) Appl. No.: 10/956,744

(22) Filed: Oct. 1, 2004

(65) Prior Publication Data

US 2006/0080081 A1 Apr. 13, 2006

(51) Int. Cl.
*G06F 17/00* (2006.01)
(52) U.S. Cl. ............... 715/245; 715/243; 715/244; 715/248; 715/256
(58) Field of Classification Search ............... 715/200, 715/243, 244, 245, 248, 256
See application file for complete search history.

(56) References Cited

U.S. PATENT DOCUMENTS

| | | | |
|---|---|---|---|
| 4,284,975 A | 8/1981 | Odaka | |
| 4,291,381 A | 9/1981 | Siebeck | |
| 4,523,294 A * | 6/1985 | Winn | 400/3 |
| 4,591,999 A | 5/1986 | Logan | |
| 4,608,664 A | 8/1986 | Bartlett et al. | |
| 4,833,627 A | 5/1989 | Leszczynski | |
| 4,843,389 A * | 6/1989 | Lisle et al. | 341/106 |
| 5,018,083 A | 5/1991 | Watanabe et al. | |
| 5,175,806 A | 12/1992 | Muskovitz et al. | |
| 5,287,443 A | 2/1994 | Mameda et al. | |
| 5,399,029 A | 3/1995 | Muraoka et al. | |
| 5,416,898 A | 5/1995 | Opstad et al. | |
| 5,432,890 A | 7/1995 | Watanabe | |
| 5,500,931 A | 3/1996 | Sonnenschein | |
| 5,501,538 A | 3/1996 | Sawada et al. | |
| 5,548,700 A | 8/1996 | Bagley et al. | |
| 5,579,471 A | 11/1996 | Barber et al. | |

(Continued)

FOREIGN PATENT DOCUMENTS

JP 61-282974 12/1986

(Continued)

OTHER PUBLICATIONS

U.S. Appl. No. 09/964,293, filed Sep. 25, 2001, Shade, et al.

(Continued)

*Primary Examiner*—Stephen S Hong
*Assistant Examiner*—Gregory J Vaughn
(74) *Attorney, Agent, or Firm*—Fish & Richardson P.C.

(57) ABSTRACT

The invention features systems, methods, and computer program products for typesetting a sequence of character glyphs. In on implementation, the invention provides a spacing classification file for a character set, the classification file being a text file, containing text form definitions of multiple character classes, each character class definition being structured to define a character class as having one or more arbitrary characters, the classification file further containing, in text form, multiple inter-class spacing definitions, each inter-class spacing definition defining, for an order pair of character classes, one or more spacing parameters for the ordered pair and an associated priority for each defined spacing parameter. A line of text can be compressed or expanded according to the inter-class spacing definitions for each sequential pairs of characters in the sequence of characters defined in the classification file according to their respective priorities.

42 Claims, 11 Drawing Sheets

U.S. PATENT DOCUMENTS

| | | | |
|---|---|---|---|
| 5,581,670 A | 12/1996 | Bier et al. | |
| 5,590,260 A | 12/1996 | Morse et al. | |
| 5,617,115 A | 4/1997 | Itoh et al. | |
| 5,684,510 A * | 11/1997 | Brassell et al. | 345/443 |
| 5,724,072 A | 3/1998 | Freeman et al. | |
| 5,724,596 A | 3/1998 | Lathrop | |
| 5,740,456 A | 4/1998 | Harel et al. | |
| 5,745,889 A * | 4/1998 | Burrows | 707/2 |
| 5,778,403 A | 7/1998 | Bangs | |
| 5,802,532 A | 9/1998 | Nakayama et al. | |
| 5,803,629 A | 9/1998 | Neville et al. | |
| 5,805,167 A | 9/1998 | Van Cruyningen | |
| 5,809,166 A | 9/1998 | Huang et al. | |
| 5,857,212 A * | 1/1999 | Van De Vanter | 715/234 |
| 5,937,420 A | 8/1999 | Karow et al. | |
| 6,038,567 A | 3/2000 | Young | |
| 6,081,816 A | 6/2000 | Agrawal | |
| 6,088,520 A | 7/2000 | Taoka et al. | |
| 6,252,607 B1 | 6/2001 | Babcock | |
| 6,321,243 B1 | 11/2001 | Ballard | |
| 6,330,577 B1 | 12/2001 | Kim | |
| 6,359,630 B1 | 3/2002 | Morse et al. | |
| 6,360,023 B1 * | 3/2002 | Betrisey et al. | 382/260 |
| 6,426,751 B1 | 7/2002 | Patel et al. | |
| 6,504,544 B1 | 1/2003 | Hollingsworth et al. | |
| 6,507,678 B2 | 1/2003 | Yahagi | |
| 6,510,441 B1 | 1/2003 | Kenninga | |
| 6,624,814 B1 | 9/2003 | Karow et al. | |
| 6,626,960 B1 | 9/2003 | Gillam | |
| 6,686,935 B1 | 2/2004 | Richard | |
| 6,829,748 B1 | 12/2004 | Browne et al. | |
| 6,886,133 B2 | 4/2005 | Bailey et al. | |
| 6,928,611 B2 * | 8/2005 | McCully et al. | 715/245 |
| 7,039,862 B2 | 5/2006 | Menninga | |
| 7,168,037 B2 * | 1/2007 | Shade et al. | 715/244 |
| 2001/0048764 A1 | 12/2001 | Betrisey et al. | |
| 2002/0062324 A1 * | 5/2002 | McCully et al. | 707/517 |
| 2002/0107866 A1 * | 8/2002 | Cousins et al. | 707/102 |
| 2002/0124026 A1 * | 9/2002 | Weber | 707/526 |
| 2003/0033594 A1 * | 2/2003 | Bowen | 717/141 |
| 2004/0008208 A1 * | 1/2004 | Dresevic et al. | 345/589 |
| 2004/0125107 A1 | 7/2004 | McCully et al. | |
| 2004/0125108 A1 | 7/2004 | McCully et al. | |
| 2004/0253568 A1 * | 12/2004 | Shaver-Troup | 434/178 |
| 2005/0177786 A1 * | 8/2005 | Shade et al. | 715/518 |

FOREIGN PATENT DOCUMENTS

| | | |
|---|---|---|
| JP | 01-125656 | 5/1989 |
| JP | 1-271275 | 10/1989 |
| JP | 2-48768 | 2/1990 |
| JP | 02-213983 | 8/1990 |
| JP | 04-052871 | 2/1992 |
| JP | 04-319764 | 11/1992 |
| JP | 05-224651 | 9/1993 |
| JP | 06-20026 | 1/1994 |
| JP | 6-28343 | 2/1994 |
| JP | 06-96174 | 4/1994 |
| JP | 6-131331 | 5/1994 |
| JP | 6-149806 | 5/1994 |
| JP | 06-219011 | 8/1994 |
| JP | 07-096594 | 4/1995 |
| JP | 7-114545 | 5/1995 |
| JP | 7-137222 | 5/1995 |
| JP | 07-149005 | 6/1995 |
| JP | 07-182303 | 7/1995 |
| JP | 8-137871 | 5/1996 |
| JP | 8-161309 | 6/1996 |
| JP | 08-194832 | 7/1996 |
| JP | 08-314655 | 11/1996 |
| JP | 10-069477 | 3/1998 |
| JP | 10-222499 | 8/1998 |
| JP | 11-102446 | 4/1999 |
| JP | 11-353491 | 12/1999 |
| JP | 2000-267645 | 9/2000 |
| JP | 2001-281835 | 10/2001 |
| JP | 2001-297077 | 10/2001 |
| JP | 2002-197077 | 7/2002 |
| JP | 2003-523015 | 7/2003 |

OTHER PUBLICATIONS

Peter Karow, "Extending Control of Digital Typography", Visible Language 32.2, Visible Language 1998, pp. 100-127.

Hirschberg, D.S. et al., "New Applications of Failure Functions", *Journal of the Association for Computing Machinery*, vol. 24, no. 3, Jul. 1987, pp. 616-625.

Screenshots of Microsoft Word (character spacing feature), 1983-1999, Microsoft Corporation, pp. 1-6.

Office Action of Notice of Reason of Rejection, Japanese Patent Application No. 2003-300778, May 26, 2008, 10 pages.

* cited by examiner

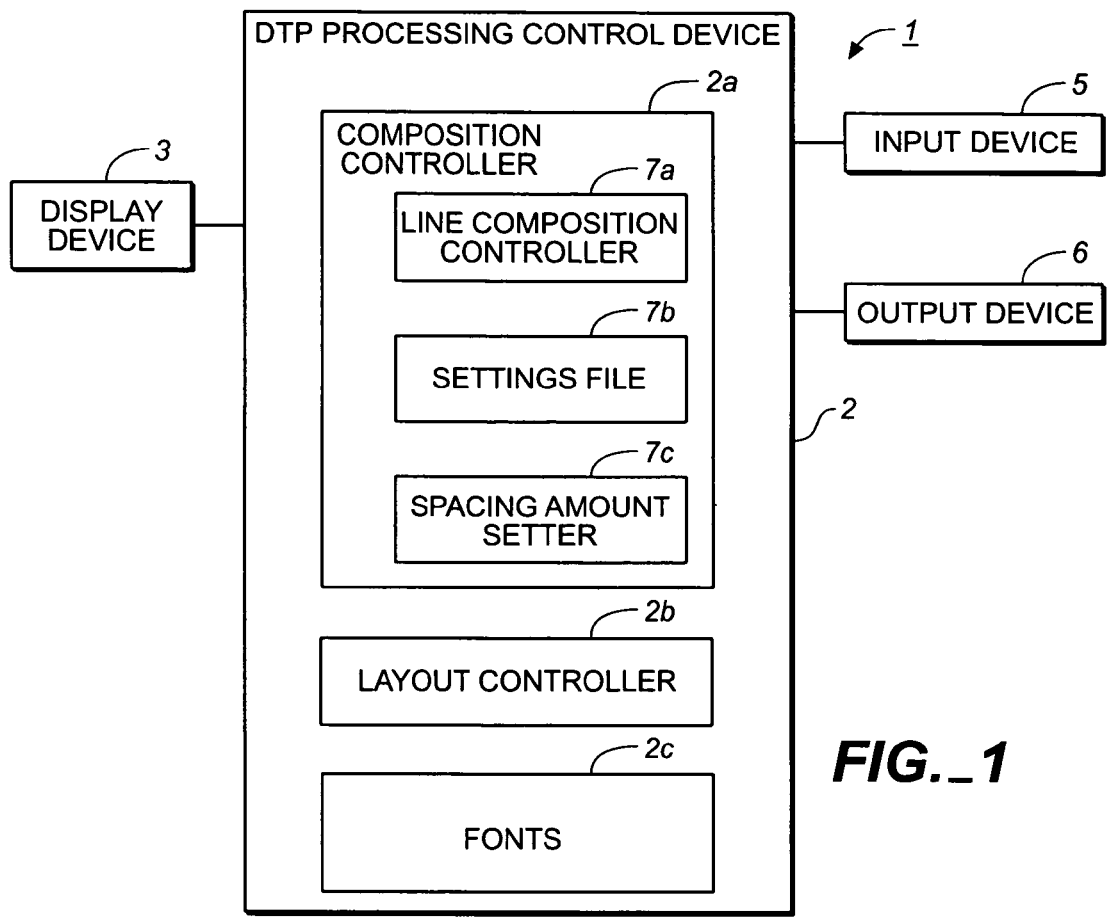
*FIG._1*
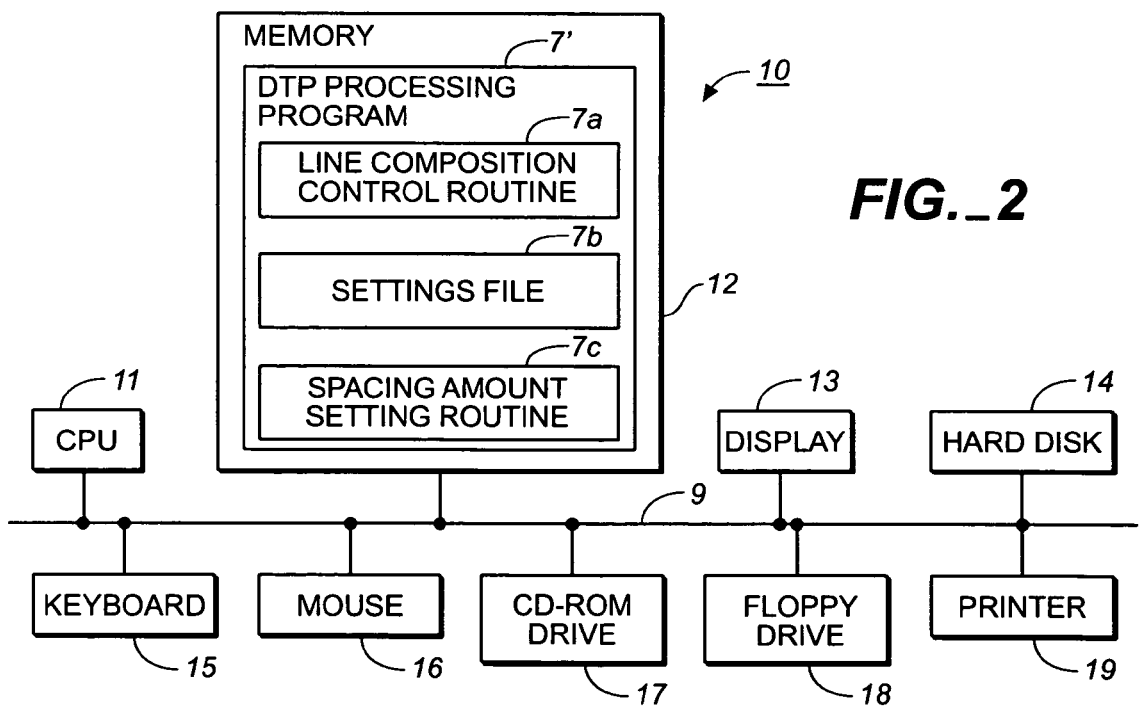
*FIG._2*

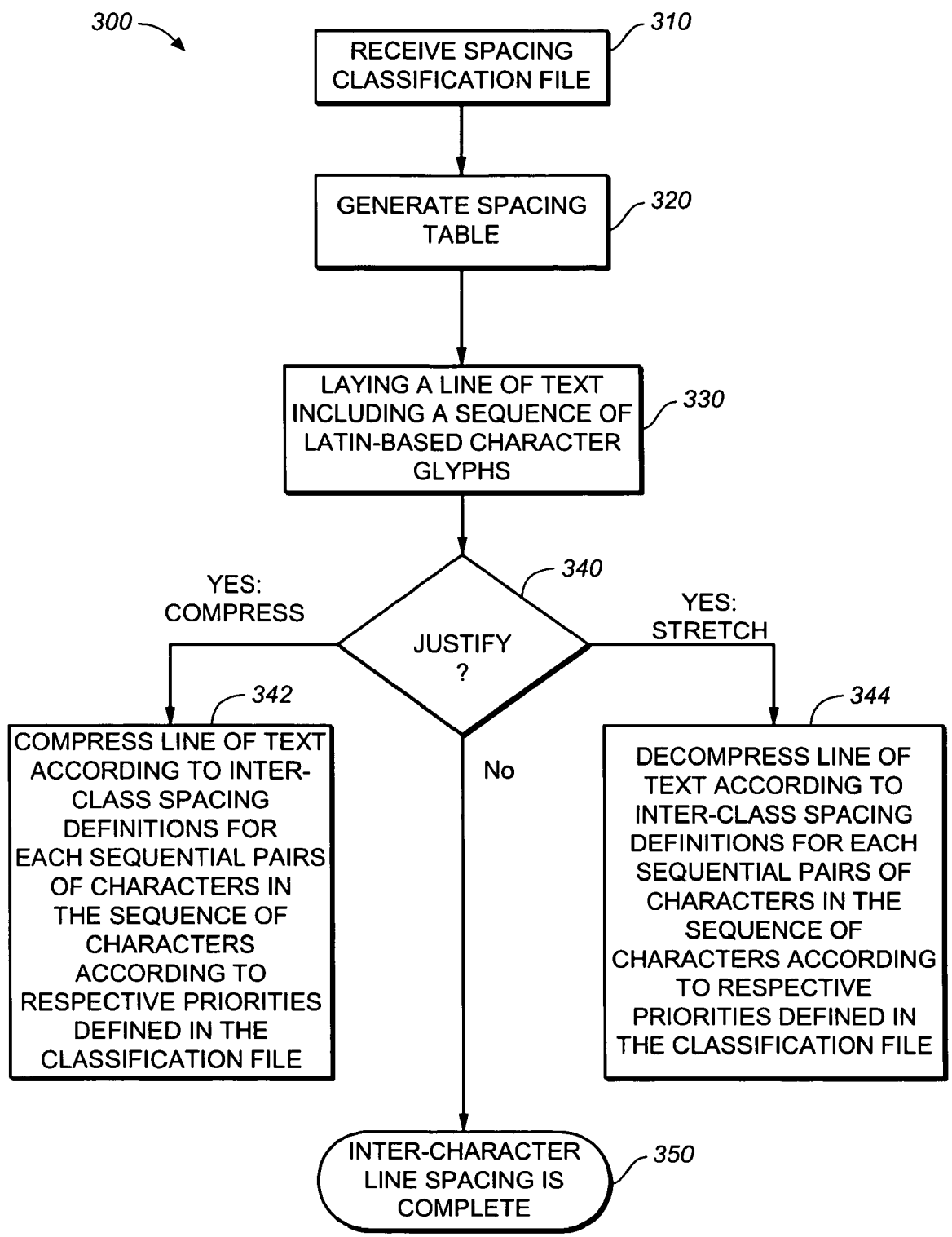
FIG._3

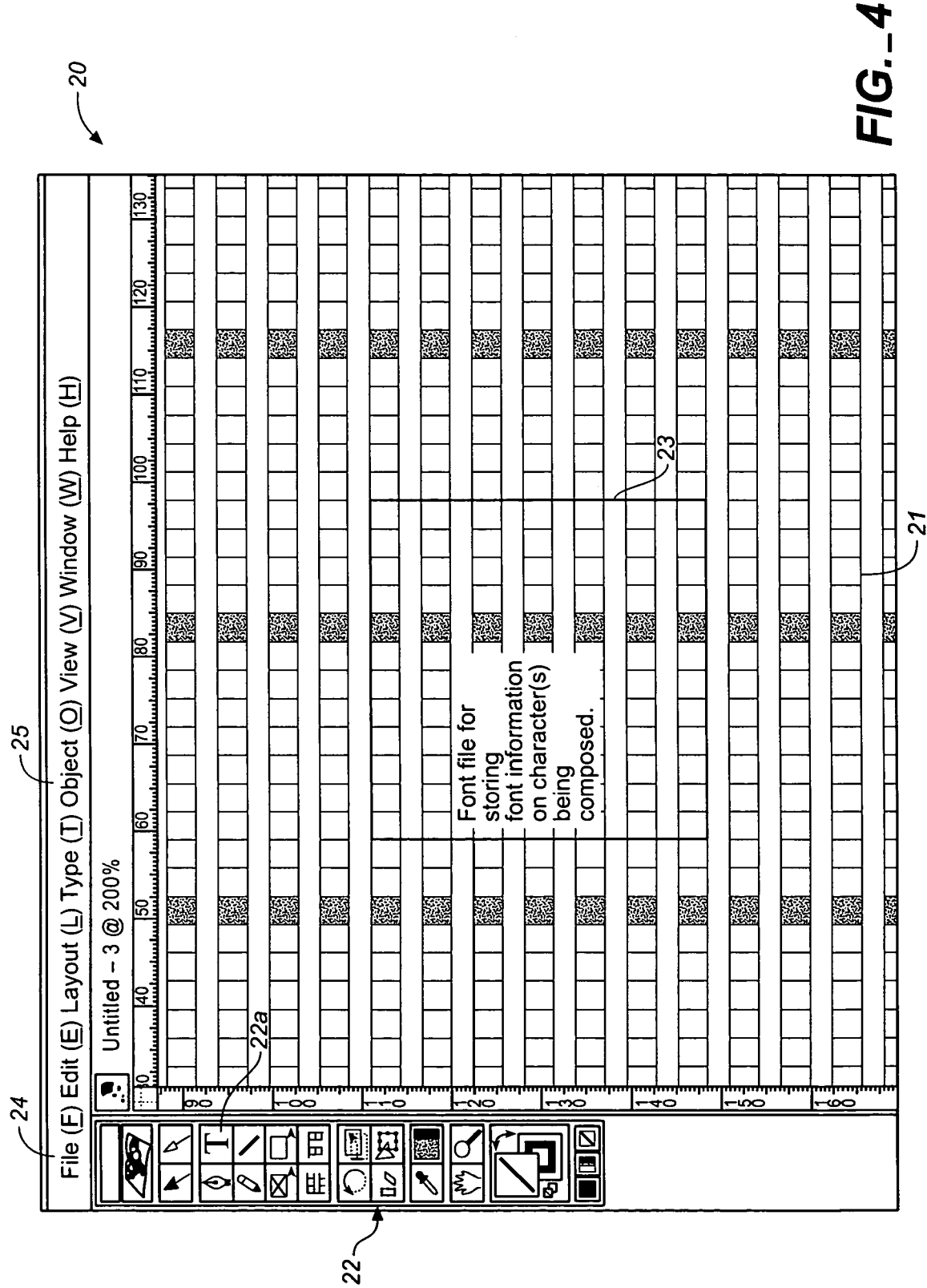
FIG._4

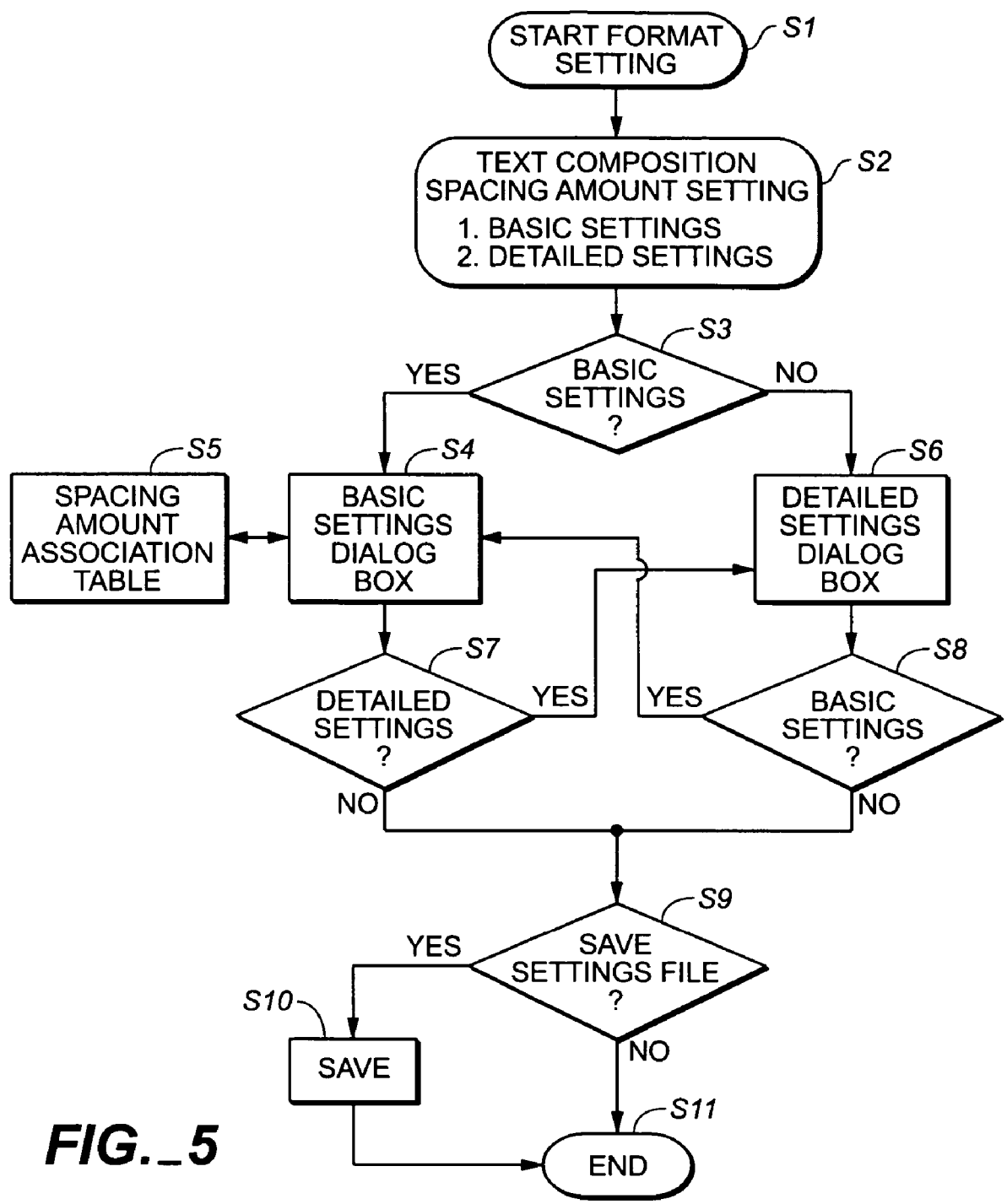
FIG._5

Character Spacing Settings

Character Composition: Punctuation full-width

Line End

| | | Desired | Minimum | Maximum |
|---|---|---|---|---|
| ☒ → | Ending Parentheses → Line End: | 50% | 50% | 50% |
| ☐ → | Periods → Line End: | 50% | 50% | 50% |
| ☐ → | Commas → Line End: | 50% | 50% | 50% |
| ☐ → | Dots → Line End: | 25% | 25% | 25% |

Line Head

| | | | | |
|---|---|---|---|---|
| ☒ → | Paragraph Head Starting Parentheses: | 50% | 50% | 50% |
| ☒ → | Paragraph Head → Glyphs: | 0% | 0% | 0% |
| ☐ → | Line Head Starting Parentheses: | 50% | 50% | 50% |

Within Line

| | | | | |
|---|---|---|---|---|
| ☒ → | Glyphs Starting Parentheses: | 50% | 0% | 50% |
| ☒ → | Ending Parentheses → Glyphs: | 50% | 0% | 50% |
| ☒ → | Ending Parentheses Starting Parentheses: | 50% | 0% | 50% |
| ☒ → | Periods → Glyphs: | 50% | 0% | 50% |
| ☒ → | Periods Starting Parentheses: | 50% | 0% | 50% |
| ☒ → | Commas → Glyphs: | 50% | 0% | 50% |
| ☒ → | Commas Starting Parentheses: | 25% | 0% | 25% |
| ☒ → | Before and after conjunctive dots: | 25% | 12.5% | 50% |
| ☒ A | Glyphs before and after Western/English alphanumeric characters: | | | |

% ▶

OK
Cancel
New
Save
Delete

Advanced Settings

| Character Spacing Settings | | | | |
|---|---|---|---|---|
| Character Composition: Line end punctuation half-width | | | | OK |
| | | | | Cancel |
| Previous character class ▼ : Starting parenthesis type ▼ | | | | New |
| Examples of Character Class: ( [ { ' " ( [ { Γ 「 | | | | Save |
| | | | | Delete |
| | | | | Advanced Settings |

| Types | Ending Character Class | Desired | Minimum | Maximum | Priority |
|---|---|---|---|---|---|
| ☐→⌐¬ | Starting Parentheses: | 0% | 0% | 0% | None ▼ |
| ☐→⌐¬ | Ending Parentheses: | 0% | 0% | 0% | 3 ▼ |
| ☐→⌐¬ | Line Head Japanese Word-wrapping: | 0% | 0% | 0% | None ▼ |
| ☐→⌐¬ | Ending Punctuation Marks: | 0% | 0% | 0% | None ▼ |
| ☐→⌐¬ | Conjunctive Dots: | 25% | 0% | 25% | None ▼ |
| ☐→⌐¬ | Commas: | 0% | 0% | 0% | 2 ▼ |
| ☐→⌐¬ | Period: | 0% | 0% | 0% | None ▼ |
| ☐→⌐¬ | Ellipses: | 0% | 0% | 100% | None ▼ |
| ☐→⌐¬ | Previous Abbreviated Symbols: | 0% | 0% | 100% | None ▼ |
| ☐→⌐¬ | Subsequent Abbreviated Symbols: | 0% | 0% | 100% | None ▼ |
| ☐→⌐¬ | Ideaographic Spaces: | 0% | 0% | 0% | None ▼ |
| ☐→⌐¬ | Hiragana: | 0% | 0% | 100% | None ▼ |
| ☐→⌐¬ | Other Ideographs: | 0% | 0% | 100% | None ▼ |
| ☐→⌐¬ | Full-width Digits: | 0% | 0% | 100% | None ▼ |
| ☐→⌐¬ | Half-width Digits: | 0% | 0% | 0% | 4 ▼ |
| ☐→⌐¬ | Western Alphabet: | 0% | 0% | 0% | 4 ▼ |
| ☐→⌐¬ | Line End: | 0% | 0% | 0% | 3 ▼ |
| ☐→⌐¬ | Paragraph Head: | 0% | 0% | 0% | 3 ▼ |

| | Previous Character | 1 | 2 | 3 | 4 | 5 | 6 |
|---|---|---|---|---|---|---|---|
| | | Starting parenthesis type | Ending parenthesis type | Character that cannot appear at the start of a line | Non-centered punctuation | Centered punctuation | Period |
| Next Character | | | | | | | |
| 1 | Starting parenthesis type | | | | | | |
| 2 | Ending parenthesis type | 3 | | | | 8 | |
| 3 | Character that cannot appear at the start of a line | 1 | | | | 8 | |
| 4 | Non-centered punctuation | 1 | | 2 | 2 | 8 | |
| 5 | Centered punctuation | 8 | 8 | 8 | 8 | 8 | 8 |
| 6 | Period | 4 | | 5 | 5 | 8 | |
| 7 | Comma | 6 | | 7 | 7 | 8 | |
| 8 | Repeating characters that cannot be broken across lines | 1 | | | | 8 | |
| 9 | Preceding abbreviation code | 1 | | | | 8 | |
| 10 | Following abbreviation code | 1 | | | | 8 | |
| 11 | Full-width ideographic spaces | 1 | | | | 8 | |
| 12 | Hiragana | 1 | | | | 8 | |
| 13 | Japanese character other than those listed above | 1 | | | | 8 | |
| 14 | Full-width numeral | 1 | | | | 8 | |
| 15 | Half-width numeral | 1 | | | | 8 | |
| 16 | Half-width Latin text | 1 | | | | 8 | |
| 17 | End of line | 12 | | | | | |
| 18 | Start of paragraph | 10 | | | | | |

| | 7 | 8 | 9 | 10 | 11 | 12 | 13 | 14 | 15 | 16 | 17 |
|---|---|---|---|---|---|---|---|---|---|---|---|
| | Comma | Repeating characters that cannot be broken across lines | Preceding abbreviation code | Following abbreviation code | Full-width ideographic spaces | Hiragana | Japanese character other than those listed above | Full-width numeral | Half-width numeral | Half-width Latin text | End of line |
| | | 2 | 2 | 2 | | 2 | 2 | 2 | 2 | 2 | 13 |
| | | 8 | 8 | 8 | 8 | 8 | 8 | 8 | 8 | 8 | 16 |
| | | 5 | 5 | 5 | 5 | 5 | 5 | 5 | 5 | 5 | 14 |
| | | 7 | 7 | 7 | 7 | 7 | 7 | 7 | 7 | 7 | 15 |
| | | | | | | | | | | | |
| | | | | | | | | | | | |
| | | | | | | | | | 9 | 9 | |
| | | | | | | 9 | 9 | 9 | 9 | 9 | |
| | | | | | | 9 | 9 | 9 | 9 | 9 | |
| | | | | | | | | | | | |
| | | 11 | 11 | 11 | 11 | 11 | 11 | 11 | 11 | 11 | |

|  |  | Text Composition Settings File Name |
|---|---|---|
| Default Settings | 1 | Set punctutation half-width at line end |
|  | 2 | Set close paren / quote half-width at line end, paragraph indentation 1 em (set opening paren / quote full-width) |
|  | 3 | Set close paren / quote half-width at line end, paragraph indentation 1 em (set opening paren / quote half-width) |
|  | 4 | Set punctutation full-width, paragraph indentation 1 em |
|  | 5 | Set punctuation full-width, paragraph indentation 1 em (set opening paren / quote full-width) |
|  | 6 | Set punctuation full-width / half-width at line end, paragraph indentation 1 em |
|  | 7 | Set punctuation full-width / half-width at line end, paragraph indentation 1 em (set opening paren / quote full-width) |
|  | 8 | Set punctuation full-width / half-width at line end, paragraph indentation 1 em (set opening paren / quote half-width) |
|  | 9 | Set punctuation half-width at line end, paragraph indentation 1 em |
|  | 10 | Set punctutation full-width |
|  | 11 | Set close paren / quote full-width / half-width at line end |
|  | 12 | Set period full-width at line end, paragraph indentation 1 em |
|  | 13 | Set period full-width at line end, paragraph indentation 1 em (set opening paren / quote full-width) |
|  | 14 | Set period full-width at line end |
| Individual Settings | 15 |  |
|  | 16 |  |
|  | 17 |  |
|  | 18 |  |
|  | 19 |  |
|  | 20 |  |

FIG._9

|  | Previous Character | 1 | 2 | 3 | 4 | 5 | 6 |
|---|---|---|---|---|---|---|---|
|  |  | Starting parenthesis type | Ending parenthesis type | Character that cannot appear at the start of a line | Non-centered punctuation | Centered punctuation | Period |
| Next Character | 1 Starting parenthesis type |  |  |  |  |  |  |
|  | 2 Ending parenthesis type |  |  |  |  |  |  |
|  | 3 Character that cannot appear at the start of a line |  |  |  |  |  |  |
|  | 4 Non-centered punctuation |  |  |  |  |  |  |
|  | 5 Centered punctuation |  |  |  |  |  |  |
|  | 6 Period |  |  |  |  |  |  |
|  | 7 Comma |  |  |  |  |  |  |
|  | 8 Repeating characters that cannot be broken across lines |  |  |  |  |  |  |
|  | 9 Preceding abbreviation code |  |  |  |  |  |  |
|  | 10 Following abbreviation code |  |  |  |  |  |  |
|  | 11 Full-width ideographic spaces |  |  |  |  |  |  |
|  | 12 Hiragana |  |  |  |  |  |  |
|  | 13 Japanese character other than those listed above |  |  |  |  |  |  |
|  | 14 Full-width numeral |  |  |  |  |  |  |
|  | 15 Half-width numeral |  |  |  |  |  |  |
|  | 16 Half-width Latin text |  |  |  |  |  |  |
|  | 17 End of line |  |  |  |  |  |  |
|  | 18 Start of paragraph |  |  |  |  |  |  |

| Optimum | Minimum | Maximum | Priority |
|---|---|---|---|
| 50% | 0% | 50% | 3 |

*FIG._10A*

| 7 | 8 | 9 | 10 | 11 | 12 | 13 | 14 | 15 | 16 | 17 |
|---|---|---|---|---|---|---|---|---|---|---|
| Comma | Repeating characters that cannot be broken across lines | Preceding abbreviation code | Following abbreviation code | Full-width ideographic spaces | Hiragana | Japanese character other than those listed above | Full-width numeral | Half-width numeral | Half-width Latin text | End of line |
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |

RULE-BASED TEXT LAYOUT

BACKGROUND

The invention relates to digital typography.

In digital text composition, a spacing amount between adjacent characters must be set in order to arrange a series of characters in a line of text. In digital text composition, a large number of characters and types of characters are processed, and the spacing amount is typically set based on character attributes. In practice, however, each publishing company has its own rules, and setting the spacing amount between characters in existing electronic composition systems is complicated, leading to operations that are extremely difficult and hard to understand for a user.

Generally, when a computer program, e.g., desktop publishing (DTP) system, is laying out text, the space between a pair of characters is specified by the width of the characters specified in the font, which is typically adjusted by any kerning specified in the font and by any tracking that is applied. Tracking is the process of uniformly increasing or decreasing the space between all glyphs in a block of text and is sometimes called character spacing or letter spacing. Tracking is generally set manually by a user. Thus, when a conventional computer program needs to justify text on both margins, the user can specify the amount of space to add or subtract from between letters (letter spacing) and the amount of space to add or subtract between words (word spacing), but that is all.

SUMMARY OF THE INVENTION

The present invention, in one aspect, provides methods and apparatus, including programs, allowing a user to have more control in defining rules for character spacing and justification. For example, a user can define a set of rules that in say "always put ⅛ em before a colon and a semi-colon character" and apply them to text set in standard French. Similarly, a user can define a set of rules that in effect say "allow 1 pt space between words, and then 0.1 pts between letters, and then 2 pts more between words as necessary."

In general, in another aspect, the invention provides a completely flexible classification scheme for grouping characters into classes coupled with prioritized justification rules that operate at the level of character classes.

In general, in another aspect, the invention features a computer program product, tangibly embodied on an information carrier, comprising instructions operable to cause data processing apparatus to perform operations. The computer program product includes receiving a spacing classification file for a character set, the character set including Arabic numbers, punctuation characters, and diacritical marks, the classification file being a text file containing in text form definitions of multiple character classes, each character class definition being structured to define a character class as having one or more arbitrary characters, the classification file further containing, in text form, multiple inter-class spacing definitions, each inter-class spacing definition defining, for an order pair of character classes, one or more spacing parameters for the ordered pair and an associated priority for each defined spacing parameter. The computer program product includes laying out a line of text comprising a sequence of character glyphs derived from a sequence of characters. If the line of text needs to be compressed, the computer program product includes compressing the line of text according to the inter-class spacing definitions for each sequential pairs of characters in the sequence of characters defined in the classification file according to their respective priorities. If the line of text needs to be expanded, the computer program product includes decompressing the line of text according to the inter-class spacing definitions for each sequential pairs of characters in the sequence of characters defined in the classification file according to their respective priorities.

The invention can be implemented to realize one or more of the following advantages. A user can easily and quickly set inter-character spacing amounts in digital composition. A user can create a text file, e.g., a file containing an Extensible Markup Language (XML) document, defining different character classes and the members of each class for use in setting inter-character spacing. The user can define character classes and spacing rules to fit a particular publishing application or to match different language spacing conventions for particular languages. The user can define a set of spacing rules for combinations of character classes as well as priority rules for justification processes. A spacing table can be generated from the text file. The generated spacing table can be stored in a settings file for use by a spacing amount setting routine. A user can select the inter-character spacing table to set the inter-character spacing for a string of characters. The technology can operate in the application domain where techniques can be applied to any font, so that individual fonts do not have to implement any features to enable use of the methods or apparatus of the invention. Moreover, in the application domain it is possible to allow user customization of the rules which offers great flexibility.

The details of one or more implementations of the invention are set forth in the accompanying drawings and the description below. Other features, aspects, and advantages of the invention will become apparent from the description, the drawings, and the claims.

BRIEF DESCRIPTION OF THE DRAWINGS

FIG. 1 is a schematic block diagram showing a DTP system provided with a text composition spacing amount setting function in accordance with one implementation of the invention.

FIG. 2 is a schematic block diagram showing a DTP system based on a general-purpose computer provided with a text composition spacing amount setting function in accordance with another implementation of the invention.

FIG. 3 is a flowchart showing the processing flow of a text composition spacing amount setting function based on one implementation of the invention.

FIG. 4 is a schematic drawing showing part of a screen during editing of an electronic document displayed on a screen in a DTP system.

FIG. 5 is a flowchart showing the processing flow of a text composition spacing amount setting function based on one implementation of the invention.

FIG. 6 is a schematic diagram showing an example of a dialog box displayed when "basic settings" is selected in the text composition spacing amount setting function in accordance with the invention.

FIG. 7 is a schematic diagram showing one example of a dialog box displayed when "detailed settings" is selected in the text composition spacing amount setting function in accordance with the invention.

FIG. 8 is a schematic diagram showing one example of a spacing amount association table used in "basic settings."

FIG. 9 is a schematic drawing showing a list of file names of spacing tables stored in a settings file.

FIG. 10 is a schematic drawing showing one example of a spacing table stored in a settings file.

Like reference symbols in the various drawings indicate like elements.

DETAILED DESCRIPTION

FIG. 1 shows an electronic composition DTP system 1, in accordance with one implementation of the invention. The DTP system 1 includes a DTP processing control device 2 that can execute electronic composition such as layout and editing, and one or more of: a display device 3 that can display data being processed; an input device 5 with which a user can input various types of data such as graphics, text, and control instructions; and an output device 6 for outputting processed data. The DTP processing control device 2 includes a composition controller 2a for controlling composition, a layout controller 2b for layout and editing, and one or more digital fonts 2c. The fonts 2c can include fonts for Latin-based character types, such as Roman type. In addition, in the system shown in FIG. 1, the composition controller 2a includes a line composition controller 7a that arranges within a line a plurality of characters that are being composed, and a settings file 7b that is used to set spacing amounts when doing line composition. The spacing amounts can include the spacing from the start of a line, or the end of a line, for a character arranged at the start of a line or the end of a line, respectively. The spacing amounts include the space between pairs of adjacent characters within a line. The composition controller 2a also includes a spacing amount setter 7c with which a user can set the spacing amount set in the settings file 7b.

The display device 3 can be any type of display device, e.g., a CRT or LCD. The input device 5 can be a keyboard, a pointing device (e.g., mouse, track ball, track pointer), a scanner, a communication interface, or a combination of them. The output device 6 can be, for example, a printer or an external memory device. The DTP processing control device 2 can include a processor or memory, such as a CPU, or an electronic composition processing program that includes various program routines, such as a composition control routine, layout and editing routine, that is loaded into a memory and processed by a processor. Alternatively, the DTP processing control device 2 can also include, in whole or in part, hardware including firmware.

FIG. 2 is a block diagram showing a DTP system 10 in which the text composition spacing amount setting function is performed by a general-purpose computer system. The system includes a CPU 11, a memory 12, a display 13, a hard disk 14, a keyboard 15, a mouse 16, a CD-ROM drive 17, a floppy disk drive 18, and a printer 19. These units are interlinked in operation by a bus 9 or multiple busses. A DTP processing program 7' is installed in the system 10 together with other digital editing programs. The DTP processing program 7' includes a line composition control routine 7a used in electronic composition, a settings file 7b used in text composition and a spacing amount setting routine 7c that enables a user to set the spacing amounts in the settings file 7b. The DTP processing program (7') and the other editing programs can be installed using the CD-ROM drive 17 or the floppy disk drive 18, or can be downloaded through a communication network, such as the Internet, and be stored on the hard disk 14, for example. In addition, a layout control routine or the fonts 2c can also be stored on the hard disk 14. The DTP processing program 7' stored on the hard disk 14 can be started by a user operating the keyboard 15 or the mouse 16, and is loaded into the memory 12 as shown in FIG. 2. Thus, the loaded DTP processing program 7' exists in both the CPU 11 and in the memory 12, and constitutes the DTP processing control device 2, and includes the settings file 7b, or data extracted from the settings file 7b, and the spacing amount setter 7c.

Spacing Tables

The settings file 7b includes or specifies one or more spacing tables. The spacing tables can include predefined tables, user-modified tables, and user created tables. In one implementation, the settings file 7b includes one or more spacing classification files that can be used to create one or more spacing tables. In one implementation, the spacing classification file is an XML document. The character classifications and rules for setting inter-character of a spacing table can be applied when spacing a line of text. Processes for setting inter-character spacing in a DTP system, including selecting or modifying a spacing table, are discussed in detail below.

A user can define a classification system. A classification system defines a set of character classes and a set of spacing rules defined for particular class to class character sequences. The user can flexibly define any character class to include any arbitrary number of any arbitrary characters. For example, for each character class the user defines a class name and also designates one or more characters to populate each of the classes. In one implementation, the user can use Unicode code points to designate characters to be included in a class. In one implementation, the designated characters include Latin-based characters including Arabic numerals, punctuation characters, and diacritical marks.

For example, a user can define a character class that the user names "colons." The user defines the "colons" class to include a "colon" character and a "semi-colon" character. Thus, both characters ":" and ";" are members of the "colons" character class, and any spacing rule defined for the "colons" character class will apply to all characters in the character class. The spacing rules can also define spacing rules for "whitespace" (i.e., the spacing between words) by defining a character class corresponding to characters indicative of a space between words (e.g., a "space" character). Thus, the classifications can define rules for spacing between characters within a word as well as the spacing between words. Character classes can include a large number of different characters. For example, an "all other characters" class can designate as members of the class all legal code points not included in another user-defined character class.

The classification system also includes a set of spacing rules. Spacing rules define spacing behavior between adjacent character classes. In one example rule, for a character class designated "period," which includes the "." character, a spacing rule for a period character followed by a second period character adds 0.1 em to the inter-character spacing between the periods (i.e., creating a typical spacing for ellipses). In another example, rule spacing for a character from the "all other characters" class followed by a character in the "colons" class is adjusted to add ⅛ em to the spacing between the two characters, corresponding to a French language typographic custom. The units of spacing can also be defined, for example, as fractions of spaces or em spaces.

Each spacing rule can also define justification parameters and a priority value for use during a line justification processes. The priority designates a place in order (with respect to other rules) in which the rule is applied to add or remove space from a particular rule-defined pair of character classes during a justification process. For example, in one implementation, spacing rules having a high priority are executed first in a justification process to compress or stretch the width of a line of text. The rules are applied in order of priority until the necessary justification is achieved.

The justification process can stretch or compress a composed line of text to achieve a target width. Each spacing rule defines a first justification parameter that sets a spacing value that can be added between a pair of characters when a line is to be stretched. The rule also defines a second justification parameter that sets a spacing amount that can be removed from between a pair characters when a line is to be compressed. For example, a rule can designate that the spacing value between the pair of characters can stretch by 0.33 em or be compressed by 0.20 em in response to a justification process. Thus, the justification parameters define an adjustable range of spacing between a particular pair of characters.

Table 1, below, illustrates an example portion of an XML document defining a classification system including character classes and spacing rules.

TABLE 1

```
<!-- start a new spacing system rule-set)called "complex1" -->
- <JustificationParameters name="complex1">
<!-- the classification system used by this "complex1" -->
- <ClassificationSystem>
- <Classification name="flush_space">
<Include unicode="u2001" />
</Classification>
- <Classification name="stretch_space">
<!-- spaces that will change width breaking & nonbreaking both)
-->
<Include unicode="u00A0" string="" />
</Classification>
- <Classification name="ilg">
<!-- inline graphic -->
<Include unicode="ufffc" />
</Classification>
- <Classification name="dashes">
<!-- dashes: em-dash & en-dash -->
<Include unicode="u2013" />
<Include unicode="u2014" />
</Classification>
- <Classification name="openPunctuation">
<Include class="_openPunctuation" />
</Classification>
- <Classification name="closePunctuation">
<Include class="_punctuation" />
</Classification>
- <Classification name="nonWhite">
<Exclude class="_whitespace" />
</Classification>
</ClassificationSystem>
<!-- spacing rules to apply to the classes specified above -->
- <SpacingRules>
<!-- Add space around dashes: dashes next to non-white
space add 1/8 em -->
<!-- by default add "space" of 0.125 of an "emspace" -->
<!-- low priority, allow 0.05 of an em delta to width -->
<!-- lower priority, allow 0.0525 of an em delta to width-->
<!-- the next 4 rules are all to apply space before dashes-->
- <Spacing before="nonWhite" after="dashes" space="0.125"
units="_emspace">
<Justify priority="-4" compress="-0.05" stretch="0.05" />
<Justify priority="-6" compress="-0.0525" stretch="0.0525" />
</Spacing>
- <Spacing before="closePunctuation" after="dashes" space="0.125"
units="_emspace">
<Justify priority="-4" compress="-0.05" stretch="0.05" />
<Justify priority="-6" compress="-0.0525" stretch="0.0525" />
</Spacing>
- <Spacing before="openPunctuation" after="dashes" space="0.125"
units="_emspace">
<Justify priority="-4" compress="-0.05" stretch="0.05" />
<Justify priority="-6" compress="-0.0525" stretch="0.0525" />
</Spacing>
- <Spacing before="ilg" after="dashes" space="0.125"
units="_emspace">
<Justify priority="-4" compress="-0.05" stretch="0.05" />
<Justify priority="-6" compress="-0.0525" stretch="0.0525" />
</Spacing>
```

TABLE 1-continued

```
<!-- the next 4 rules are all to apply space after dashes-->
- <Spacing before="dashes" after="nonWhite" space="0.125"
units="_emspace">
<Justify priority="-4" compress="-0.05" stretch="0.05" />
<Justify priority="-6" compress="-0.0525" stretch="0.0525" />
</Spacing>
- <Spacing before="dashes" after="openPunctuation" space="0.125"
units="_emspace">
<Justify priority="-4" compress="-0.05" stretch="0.05" />
<Justify priority="-6" compress="-0.0525" stretch="0.0525" />
</Spacing>
- <Spacing before="dashes" after="closePunctuation" space="0.125"
units="_emspace">
<Justify priority="-4" compress="-0.05" stretch="0.05" />
<Justify priority="-6" compress="-0.0525" stretch="0.0525" />
</Spacing>
- <Spacing before="dashes" after="ilg" space="0.125"
units="_emspace">
<Justify priority="-4" compress="-0.05" stretch="0.05" />
<Justify priority="-6" compress="-0.0525" stretch="0.0525" />
</Spacing>
<!-- flush space: a space that can get infinitely large if
necessary -->
<!-- add no "compress", and no "space", but allow a lot of
"stretch" -->
- <Spacing before="flush_space" after="nonWhite">
<Justify priority="10" stretch="99999.0" />
</Spacing>
- <Spacing before="flush_space" after="flush_space">
<Justify priority="10" stretch="99999.0" />
</Spacing>
- <Spacing before="flush_space" after="stretch_space">
<Justify priority="10" stretch="99999.0" />
</Spacing>
- <Spacing before="flush_space" after="openPunctuation">
<Justify priority="10" stretch="99999.0" />
</Spacing>
- <Spacing before="flush_space" after="closePunctuation">
<Justify priority="10" stretch="99999.0" />
</Spacing>
- <Spacing before="flush_space" after="ilg">
<Justify priority="10" stretch="99999.0" />
</Spacing>
- <Spacing before="flush_space" after="dashes">
<Justify priority="10" stretch="99999.0" />
</Spacing>
<!-- add additional space around ILGs when graphics are
next to spaces -->
<!-- a small amount of space can be added next to graphics -->
<!-- more space can be added with lower priority -->
- <Spacing before="ilg" after="stretch_space" units="_space">
<Justify priority="5" stretch="0.5" />
<Justify priority="-1" stretch="0.5" />
</Spacing>
- <Spacing before="stretch_space" after="ilg" units="_space">
<Justify priority="5" compress="-.15" stretch="0.5" />
<Justify priority="-1" compress="-.06" stretch="0.5" />
</Spacing>
<!-- ignore runs of multiple spaces: space + space = just 1
space -->
<!-- remove the width of a space character (space = -1)
-->
<!-- don't add stretch or compress at all -->
<Spacing before="stretch_space" after="stretch_space" space="-1.0"
units="_space" />
<!-- word space: space added/removed from stretch-spaces
next to other classes -->
- <!-- multiple specification of stretch & compress with
different priorities to inter-mingle with other justification
settings at other priorities -->
- <Spacing before="stretch_space" after="nonWhite" units="_space">
<Justify priority="5" compress="-0.20" stretch="0.33" />
<Justify priority="-1" compress="-0.05" stretch="0.2" />
<Justify priority="-5" compress="-0.05" stretch="0.5" />
</Spacing>
```

TABLE 1-continued

```
- <Spacing before="stretch_space" after="dashes" units="_space">
<Justify priority="5" compress="-0.15" stretch="0.40" />
<Justify priority="-1" compress="-0.03" stretch="0.3" />
<Justify priority="-5" compress="-0.03" stretch="0.5" />
</Spacing>
- <Spacing before="stretch_space" after="closePunctuation"
units="_space">
<Justify priority="5" compress="-0.20" stretch="0.33" />
<Justify priority="-1" compress="-0.05" stretch="0.2" />
<Justify priority="-5" compress="-0.05" stretch="0.5" />
</Spacing>
- <Spacing before="stretch_space" after="openPunctuation"
units="_space">
<Justify priority="5" compress="-0.15" stretch="0.40" />
<Justify priority="-1" compress="-0.03" stretch="0.3" />
<Justify priority="-5" compress="-0.03" stretch="0.5" />
</Spacing>
- <Spacing before="closePunctuation" after="stretch_space"
units="_space">
<Justify priority="5" stretch="0.1" />
<Justify priority="-5" stretch="0.1" />
</Spacing>
<!-- letter space -->
- <Spacing before="nonWhite" after="nonWhite" units="_space">
<Justify priority="-6" compress="-0.005" stretch="0.005" />
<Justify priority="-11" compress="-0.5" stretch="0.5" />
</Spacing>
</SpacingRules>
</JustificationParameters>
- <!--<Classification name="period"> <Include string="."/>
</Classification>-->
```

A user can create the classification as an XML document and store it as a file, for example, on hard disk 14 (FIG. 2), or within the settings file 7*b* for later use by a DTP system. Alternatively, the user can initiate the DTP system or another program, after creating or receiving the XML document, to convert the XML document into a spacing table for use in setting the inter-character spacing for a text. For example, the user can use the XML document to generate a spacing table for storage within the settings file 7*b* for later use by the user. The user can also edit the XML document further to redefine the classification system or the user can create a new XML document defining a different classification system that includes an arbitrary set of character classes and an arbitrary set of spacing rules defined for particular class to class character sequences. The user can create a number of different XML documents, each defining a classification system for a particular publishing application. For example, different XML documents can be created that include classification systems tailored for inter-character spacing conventions of different languages.

Setting Inter-Character Spacing in a DTP System

A user interface allows the user to generate a spacing table directly, from a selected XML document, or otherwise. In one implementation, a conventional XML editor can be used, for example, xmlspy or XMetaL to create the XML document.

Alternatively, a user interface can be provided within a program, e.g., DTP system, for rendering spacing tables from XML documents. In one implementation, the user interface includes one or more menu items allowing the user to select an XML document. For example, a pull-down menu can list XML documents that the user can select from. Alternatively, the user can import an XML document. The user interface can read the selected XML document to display a window including the spacing table in a tabular form. The window includes scrolling bars for the horizontal and vertical axes for displaying spacing tables of varying sizes within the window. The tables will have multiple columns and rows. The labels for the columns and rows identify the different character classes defined by the classification. The same character class labels can be used for both the rows and columns of the spreadsheet.

Each listed character class can be shown with a link or control that when selected displays definitional information for the selected character class, for example, in a new window. The definitional information identifies the member characters of the character class. Additionally, the definitional information can include a listing of the spacing rules associated with the selected character class which optionally can be edited by the user.

The intersection of a particular row and column in the table is the logical location for spacing rule data for the corresponding ordered pair of character classes. For example, the row labels can represent the first character class of a pair of character classes, while the column labels represent the second character class of a pair of character classes. Thus, the intersection data indicates the spacing rule for a pair of characters where the first character is a member of the character class indicated by the row and the next character is a member of the character class indicated by the column. The spacing rule data associated with the intersection can include the inter-character spacing value as well as the justification spacing range and priority for stretching and compressing the spacing between the two character classes. The table can be static or the user can directly edit the spacing rules through the spacing table presented in the user interface. The spacing table can be saved to the DTP system for later use.

A process 300 for using a spacing classification file (e.g., an XML document) to define inter-character spacing using a DTP system is shown in FIG. 3. The spacing classification file is received by the DTP system (step 310). In one implementation, the inter-character spacing amount is set in a DTP system by a user selection of a table generated from an XML document where the XML document defines a classification system, as described above, that includes a set of character classifications and a set of spacing rules. For example, a pull-down menu listing the spacing tables can include one or more tables generated from one or more XML document. Alternatively, the user can identify the XML document for use in creating a particular spacing table defined by the XML document. The spacing table is generated from the XML document, for example, through the user interface described above and stored in the settings file 7*b* of the DTP system (step 320). Alternatively, a classification and thereby a spacing table can be made selectable as a style, or a feature of a style, that can be applied by a user through conventional user interface controls to a block of text.

After the desired spacing table is selected, the line composition control routine 7*a* applies the table to a sequence of character glyphs (step 330). The sequence of characters can be a line of characters, a paragraph, a page, or an entire electronic document. In a first iteration of the line composition control routine 7*a*, each character is mapped to a particular character classification in the selected spacing table. Once each of the characters is mapped to its respective character classification, the spacing between characters can be determined using the spacing rules defined by the table for the respective pairs of character classifications in the text. This can optionally be done in addition to, or in place of, spacing determined by font-specific kerning information. After applying the spacing rules, the process of setting the inter-character line spacing is complete if the line does not need justification or otherwise need to be adjusted to have a certain width or fall within a certain range of widths.

If it is necessary to justify, or adjust the width, of a line of text, for example, to meet line break preferences, a determination is made whether to stretch (expand) or compress the width of the line of text in order to satisfy the justification requirements (step 340). The justification parameters in each spacing rule, both for compression and stretching the spacing between a pair of rule-defined character classes, are ordered by the designated priority of each spacing rule. Beginning with the highest priority, the spacing modification defined by each spacing rule having a same priority is applied until the necessary compression or stretching of the line is accomplished. If all spacing rules for the highest priority have been applied without accomplishing the necessary result, the next highest priority spacing rules are applied. The process continues through reduced priority spacing rules until the necessary result is reached. If the line of text is to be compressed, spacing is removed from between pairs of characters according to the justification parameter values defined in the spacing rules according to priority (step 342). Similarly, if the line of text is to be stretched, spacing is added between pairs of characters according to the justification parameter values defined in the spacing rules according to priority (step 344). Once the necessary result is reached, the inter-character line spacing operation is complete for the string of characters (step 350).

The following example illustrates this process, where after the line has been correctly spaced, it has to be justified to achieve a necessary delta to its width, which delta may be positive or negative. Then, for each pair of characters, the justification values (stretch and compress) are put into a table keyed by priority. All justifications of the same priority are combined into one entry in this table. Starting with the highest priority, the maximum fraction (in the range 0.0-1.0) of each entry is selected until the necessary delta to the width is achieved. For example, if 3.5 pts are needed and the table has entries <priority 10, 2.5> <priority 5, 10.0>, . . . , the process would select fraction 1.0 for priority 10 and fraction 0.10 for priority 5. Then, for each pair, the amount added to achieve justification (which may be negative, if the line is to be compressed) is the justification value specified for the pair multiplied by the corresponding selected fraction for its priority or their sum if there is more than one.

An alternative DTP system, tailored for Japanese language typesetting, will now be described. In digital composition based on Japanese text, JISX 4051-1995 provides guidelines for line composition and describes inter-character spacing amounts, but does not address how a user can easily set inter-character spacing amounts.

FIG. 4 shows a part 20 of a screen display of the display device 3 or display such as display 13 during DTP processing in the DTP system 1 or 10 shown in FIG. 1 or FIG. 2. Specifically, FIG. 3 shows a situation in which "new" was selected in a pull-down menu obtained by clicking on "file (F)" 24 on the menu bar, a new electronic document having a page layout grid 21 was opened, a text tool 22a was selected in a tool box 22 a frame 23 for text alignment was demarcated and text including of a multiple characters was input in the frame 23. In the example shown in FIG. 4, the text input into the frame 23 has been arranged in a plurality of lines and each character in each line has been arranged based on a spacing amount between a character and the start of the line or the end of the line, or between pairs of adjacent characters with a spacing that is preset for the start of the line, end of the line, and inside the line, respectively. If two characters are disposed adjacent to each other in the same line, the spacing amount set between them based on their character attributes is stored in advance in the settings file 7b. Also, in practice, when multiple characters are disposed in one line, those characters are disposed in the line based on the spacing amounts obtained from the settings file 7b for those characters and the line composition control routine 7a appropriately adjusts the spacing amount by processing characters that cannot appear at the start of a line, and the characters are suitably disposed in the line.

The line composition control routine 7a refers to the text composition spacing amount when disposing a plurality of characters in a line, and if necessary the line composition control routine 7a disposes characters in the line while adjusting the spacing amount within the allowed range, so it is necessary to set the spacing amount for the characters used in advance. In addition, the spacing amount set for a plurality of characters disposed in a line may differ depending on the contents of an electronic document, or according to a user's preferences, so a user needs to be able to set the spacing amount. In one implementation, when the spacing amount is set based on user preferences or a standard used in a particular publishing industry, the spacing amount is sometimes not set frequently; once an appropriate value has been set, it is typically not reset. In addition, in line composition setting the spacing amount is usually not a fixed matter; sometimes a preset spacing amount is appropriately adjusted when doing forbidden processing, and so on. Therefore, it is not always necessary for the user to perform detailed spacing amount setting; sometimes setting a typical spacing amount is sufficient.

In electronic composition such as that described above, user setting of the text composition spacing amount is desirable. It is also desirable to have a DTP system provided with a spacing amount setting function with which a user can easily and quickly set the spacing amount. The specification provides a text composition spacing amount setting device and a text composition spacing amount setting program that can be used in a DTP system. In other words, the specification describes a text composition spacing amount setting function incorporated in a DTP processing system, and makes it possible to start a text composition spacing amount setting routine by selecting "text composition spacing amount setting" in a pull-down menu displayed by clicking "format (T)" in a menu bar on the screen (e.g., of display 13 shown in FIG. 4).

The general processing for text composition spacing amount setting is shown in the FIG. 5 flowchart. As described above, when a user left-clicks with a mouse on "format (T)" 25 in a menu bar on the screen, a pull-down menu is displayed (step S1). Next, when the user clicks with the mouse (step S2) on one of the setting modes in the pull-down menu—"basic settings" or "detailed settings" in "text composition spacing amount setting"—the dialog box for the selected mode (step S3) is displayed according to the selected mode. For example, if basic settings mode is selected, the basic settings dialog box is displayed (step S4), and if detailed settings mode is selected, the detailed settings dialog box is displayed (step S6). FIG. 6 shows an example of the basic settings dialog box, and FIG. 7 shows one example of the detailed settings dialog box. In basic settings mode the number of user-settable spacing amounts is limited to those usually needed in setting, so when setting the spacing amount in basic settings mode, setting is performed using the spacing amount relationship table (step S5). On the other hand, in the detailed settings mode the spacing amount is set individually with direct access to settings file 7b.

As shown in FIG. 6, a "detailed settings" button is provided in the basic settings dialog box, and a user who user clicks on this button can switch from the basic settings mode to the detailed settings mode (step S7). A "basic settings" button is provided in the detailed settings dialog box, and a user who user clicks on this button can switch from the detailed settings mode to the basic settings mode (step S8). In addition, a file name can be given to a spacing table that is modified or newly set according to this text composition spacing amount setting routine, and it can be saved in the settings file 7b (step S9, S10), and this routine can be ended with or without saving (step S11).

The text composition spacing amount setting routine outlined above, based on one implementation, shown in FIG. 5, will be explained in additional detail below. First, if a user selects the basic settings mode, the basic settings dialog box shown in FIG. 6 is displayed. Specifically, in the dialog box shown in FIG. 6, "set punctuation full-width" is displayed. This "set punctuation full-width" is the name of a file selected from among a plurality of spacing tables stored in the settings file 7b. That is, the spacing amount setting routine 7c saves the file names of a plurality of spacing tables stored in the settings file 7b as shown in FIG. 9. Also, by displaying a pull-down menu in the list box in the FIG. 6 dialog box, a user can display as a list the file names of a plurality of spacing tables saved in the current settings file 7b. The user can select (e.g., with a mouse) the desired spacing table from the displayed list. The current spacing amount value stored in the selected spacing table is displayed in the dialog box.

Furthermore, in the implementation shown in FIG. 9, the list of file names of spacing tables stored in the spacing amount setting routine 7c is stored classified as "default settings" and "individual settings." "Default settings" stores the file names for 14 spacing tables. The 14 spacing tables are provides as an example. The "Default settings" can include more or less than 14 predefined spacing tables. These are tables in which spacing amount settings that are generally and frequently used are prepared in advance as default settings. In one implementation, the user is not able to modify the default setting files. Instead, the user can modify the spacing amounts from the default values only for the spacing amounts that need to be modified and save the modified spacing amounts as a separate file. As shown in FIG. 9, in this implementation a spacing table can be saved in "individual settings." For example, if a user wants to create a spacing table with values similar to the spacing setting values in "set punctuation full-width," which is the default setting table in FIG. 6, but somewhat different spacing amounts, the user clicks on the "new" button in FIG. 6. This allows the user to enter a file name for a new spacing table and the newly entered file name is displayed in a box. A new spacing table can now be created by modifying or entering spacing amounts in the FIG. 6 dialog box, and the new spacing table is saved in the settings file (7b). The file name of that spacing table is saved in the "individual settings" section shown in FIG. 9. A spacing table saved in the "individual settings" section can be retrieved any number of times by selecting the file name from the pull-down menu listing in either basic settings or detailed settings, and the spacing amount settings can be modified and saved. A spacing table whose file name is stored in the individual settings section is one that was individually created by a user, so a user can freely set and modify any spacing amount any number of times. By dividing and saving the plurality of spacing tables stored in the settings file (7b) as "default settings" that a user cannot modify and "individual settings" that a user can freely modify, respectively, as shown in FIG. 9, the ease of setting and modifying spacing amounts greatly increases for the user.

As shown in FIG. 6, the setting items in for Japanese text composition spacing amount basic settings are categorized as end of line, start of line, and middle of line. Accordingly, a user knows at one glance to which part of each line a setting item pertains to. The spacing amount setting items include 16 items, and it is possible to set three spacing amounts—"optimum," "minimum," and "maximum"—for each setting item.

In one implementation, the spacing amount settings are limited to these 16 items.

Character classes can be defined according to character composition attributes, such as the divisibility of characters such as text, and so on according to character width, character spacing and forbidden processing parameters. In one implementation, in addition to start of line, start of paragraph, and end of line, 16 character classes are defined for setting the inter-character spacing for Japanese characters as follows:

(1) Starting parenthesis
Example: (
(2) Ending parenthesis
Example: )
(3) Character that cannot appear at the start of a line
Example: /~
(4) Non-centered punctuation
Example: !?
(5) Centered punctuation
Example: :;
(6) Period
Example: .
(7) Comma
Example: ,
(8) Repeating characters that cannot be broken across lines
Example: —
(9) Preceding abbreviation code
Example: $
(10) Following abbreviation code
Example: % ° C.
(11) Full-width ideographic spaces
(12) Hiragana
(13) Japanese character other than (1) through (12) above
(14) Full-width numeral
Example: 0 1 2 3 4 5 6 7 8 9
(15) Half-width numeral
Example: 0123456789
(16) Half-width Latin text
Example: ABCDEFGHIJKLMNOPQRSTUVWXYZ The characters are classified into 16 character classes as shown above and based on these character classes it is possible to set inter-character spacing, (i.e., the spacing amount between characters) according to whether a character disposed in a line is the start of a paragraph, the start of a line or the end of a line, or if the character is inside a line, according to which character classes a pair of adjacent characters belongs to. For example, if the previous character in a pair of adjacent characters inside a line is kanji and the next character is hiragana, the previous character's character class is "Japanese character other than above" and the next character's character class is "hiragana," so the spacing amount between these characters can be set as 50%, for example (half the width of full-width spacing amount, i.e., one-half).

In one implementation, the spacing amount between a pair of adjacent characters is set based on the character class of the previous character and the character class of the next character, using the 16 character classes defined above in addition to the start of paragraph, start of line, and end of line as parameters. FIG. 10 shows one example of a text composition spacing table set in this manner. As shown in FIG. 10, in one implementation of the spacing table lists the 16 previously described character classes, start of line and start of paragraph as parameters for "previous character" in the vertical axis direction, and lists the 16 previously described character classes and end of line as parameters for "next character" in the horizontal axis direction. Also, for example, if the character class of the previous character is "half-width Latin text"

and the character class of the next character is "centered punctuation," the spacing amount that should be set for this pair of characters is set at the intersection. In the example shown in FIG. 10, the three spacing amounts "optimum," "minimum," and "maximum" can be set at each intersection, as can "priority," which determines the type of sequence used in making adjustments in this spacing amount in relation to other spacing amounts when adjusting the spacing amount when doing line composition processing. Furthermore, in order to avoid complexity, FIG. 10 shows a representative spacing amount setting and priority setting for only one intersection, but the same sort of spacing amount and priority setting can be done at each intersection in the spacing table in FIG. 10.

The spacing table shown in FIG. 10 basically forms a 18×17 matrix, and four values can be set at each intersection of a row and column, so a user can set 18×17×4 values in each spacing table. If a user wants to set each value in the spacing table as shown in FIG. 10, the user selects the detailed settings mode. When a user selects detailed settings mode, the dialog box shown in FIG. 7 is displayed on the screen. FIG. 7 shows an case in which a spacing table with the file name "end of line punctuation half-width" as the default setting, stored in the settings file (7*b*), has been selected. Also, previous character's character class has been selected, and "starting parenthesis" has been selected as that class, and examples of the contents of that class are displayed below. It is possible to select next character class instead of previous character class. Any one of the 18 parameters as shown in the table in FIG. 10 can be selected as the previous character class, and any one of the 17 parameters as shown in FIG. 10 can be selected as the next character class.

In the example shown in FIG. 7 starting parenthesis is selected for previous character class, so the 17 parameters from "starting parenthesis," which is the next character class, to "end of line" are sequentially arranged in the vertical direction relative to this. Therefore, the uppermost level in this arrangement shows the setting values for the spacing amount (optimum 0%, minimum 0%, maximum 0%) and the priority (none) when the previous character class is starting parenthesis and the next character class is starting parenthesis, and the next level shows the setting values for spacing amount (optimum 0%, minimum 0%, maximum 0%) and priority (3) when the previous character class is starting parenthesis and the next character class is ending parenthesis.

As described above, in FIG. 7 the file name of the spacing table for the default settings is "end of line punctuation half-width," so a user cannot modify the setting values in this table, but if a user presses the "new" button and creates a copy of this table and gives it a new file name, the user can freely modify the setting values by storing it in the settings file (7*b*) as "individual settings." Spacing amounts newly set by a user and newly stored in the settings file (7*b*) in this manner can be used in line composition processing.

The user can modify each setting value in the spacing table shown in FIG. 10 by selecting detailed settings mode, but setting spacing amounts is not always performed frequently; often a user sets the preferred spacing amounts once and uses those spacing amount settings repeatedly, and subsequently does not reset the spacing amounts for a long time. In addition, even when setting spacing amounts it is very rare that each setting value in the table shown in FIG. 10 needs to be modified and the items which many users need to modify in general are often the same items.

In one implementation, the user can select the basic settings mode to simply and quickly set spacing amounts. We have studied the various associations between the character class of the previous character and the character class of the next character in the FIG. 10 spacing table, and grouped similar classes and formed a spacing amount association table having 16 links as shown in FIG. 8. Each link indicated by the numbers 1 through 16 in the spacing amount association table shown in FIG. 8 is as follows.

1) Non-punctuation->Starting parenthesis,
2) Ending parenthesis->Non-punctuation,
3) Ending parenthesis->Starting parenthesis,
4) Period->Starting parenthesis,
5) Period->Non-punctuation,
6) Comma->Starting parenthesis,
7) Comma->Non-punctuation,
8) Centered punctuation-><-Centered punctuation,
9) Half-width Latin text->Non-punctuation,
10) Start of paragraph->Starting parenthesis,
11) Start of paragraph->Non-punctuation,
12) Start of line->Starting parenthesis,
13) Ending parenthesis->End of line,
14) Period->End of line,
15) Comma->End of line,
16) Centered punctuation->End of line.

Furthermore, "non-punctuation" includes characters that cannot appear at the start of a line, non-centered punctuation, repeating characters that cannot be broken across lines, preceding abbreviation codes, following abbreviation codes, hiragana, Japanese characters other than the above, full-width numerals, half-width numerals, and half-width Latin text; these are character classes shown in the table in FIG. 8.

Also, the 16 links correspond to input (setting) items shown in the 16 dialog boxes shown in FIG. 6. That is, the links 13)~16) correspond to the four setting items for "end of line" in the dialog box in FIG. 5, the links 10)~12) correspond to the three setting items for "start of line"in the dialog box in FIG. 6, and the links 1)~9) correspond to the nine setting items for "middle of line" in the dialog box in FIG. 6. For example, the initial setting item in the section for "middle of line" in the dialog box in FIG. 6 is shown as the setting item "non-punctuation→starting parenthesis" and this corresponds to the link shown as "1" in the spacing amount association table in FIG. 8. Therefore, if the character class of the next character is "starting parenthesis," this shows that the same spacing amount is set if the character class of the next character is any one of "character that cannot appear at the start of a line," "non-centered punctuation," "repeating characters that cannot be broken across lines," "preceding abbreviation codes," "following abbreviation codes," "hiragana," "Japanese characters other than the above," "full-width numerals," "half-width numerals," and "half-width Latin text." If a user sets 50% as the spacing amount for "optimum," 0% for "minimum," and 50% for "maximum" in the initial setting item "non-punctuation→starting parenthesis" in the "middle of line" section in the dialog box in FIG. 6, that spacing amount setting is simultaneously set for the 10 combinations of previous character class and next character class indicated by "1" in FIG. 8, and the user does not need to individually set 10 combinations. Also, simply setting the three spacing amounts for optimum, minimum, and maximum for at most 16 setting items as shown in FIG. 6 is sufficient as the ordinary spacing amount setting. In addition, if a "priority" setting is used in adjusting the spacing amount in ordinary composition it often involves special composition, so that it is excluded from the setting items in the basic settings dialog box shown in FIG. 6. Accordingly, if the basic settings are used, the number of settings is reduced from 18×17×4 settings to 16×3 settings compared to using detailed settings, and the user's spacing amount setting is greatly simplified.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention has been described in terms of particular embodiments. Other embodiments are within the scope of the following claims. For example, steps of the invention can be performed in a different order and still achieve desirable results. Data used in the invention can be organized in data structures other than tables, for example, in lists and trees of various kinds. Computational steps can be performed in parallel, and the processing of a second step can be started using partial results before the processing of a first step is completed. Text files storing data in formats other than XML can be used; for example, data defining a classification and spacing rules can be organized in an electronic spreadsheet and stored in a comma-separated-value file.

What is claimed is:

1. A computer program product, tangibly embodied on a machine-readable storage device, comprising instructions operable to cause data processing apparatus to:

receive a spacing classification file specifying a classification for a Latin-based character set, the classification file being a text file containing in text form multiple character class definitions each defining a character class, each character class definition defining a character class as having one or more arbitrary Latin-based characters, the classification file further containing multiple inter-class spacing rules, in text form, each associated with an ordered pair of character classes, each inter-class spacing rule defining one or more spacing parameters for the ordered pair of character classes;

lay out a line of text comprising a sequence of Latin-based character glyphs derived from a sequence of characters using the inter-class spacing rules, the sequence of characters including one or more characters belonging to different character classes;

if the line of text needs to be compressed to a target line width, compress the line of text according to the inter-class spacing rules for each of two or more pairs of sequential characters in the sequence of characters, the inter-class spacing rules being defined in the spacing classification file, the inter-class spacing rules identifying a particular compression range for each pair of characters; and if the line of text needs to be stretched to a target line width, decompress the line of text according to the inter-class spacing rules for each of two or more pairs of sequential characters in the sequence of characters, the inter-class spacing rules being defined in the spacing classification file, the inter-class spacing rules identifying a particular stretching range for each pair of characters.

2. The program of claim 1, wherein:

the character set includes Arabic numbers, punctuation characters, and diacritical marks; and the inter-class spacing rules have priorities and are applied in stretching or expanding the line of text according to their respective priorities.

3. The program of claim 1, farther comprising instructions to:

receive user input applying the classification to a block of text.

4. A computer program product, tangibly embodied on a machine-readable storage device, comprising instructions operable to cause data processing apparatus to:

receive a line of Latin character text for typesetting;

receive user input defining a character classification and inter-class rules for character spacing and justification, the rules defining spacing parameters and justification parameters independent of font-specific glyph parameters, the rules further defining priorities for application of justification parameters in a justification process, the character classification defining classes including a many-to-one mapping of characters to classes, the rules defining spacing and justification parameters for ordered pairs of the class, each pair of characters in the line of text mapping to a pair of the classes, the user input being unconstrained by the program as to the number of two or more classes or the mapping of characters to classes, and where the justification parameters identify a particular compression or expansion range for each character class pair; and lay out the line of text in accordance with the character classification and rules.

5. The program of claim 4, further comprising instructions to:

compress the line of text according to the inter-class justification rules and their respective priorities; and stretch the line of text according to the inter-class justification rules and their respective priorities.

6. The program of claim 4, further comprising instructions to:

associate a style with a block of text, the style comprising the character classification and inter-class rules.

7. The program of claim 4, further comprising instructions to:

apply the inter-class spacing rules to a first pair of characters in addition to any kerning rules defined by a font for the first pair of characters.

8. The program of claim 4, further comprising instructions to:

apply the inter-class spacing rules to a first pair of characters in place of any kerning rules defined by a font for the first pair of characters.

9. A computer program product, tangibly embodied on a machine-readable storage device, comprising instructions operable to cause data processing apparatus to:

space a line of text comprising a sequence of characters; then justify the line of text by stretching or compressing, comprising instructions to collect stretch justification values or compress justification values for each sequential pair of characters in the line by priority, with all justifications of the same priority combined as one value, and starting with the highest priority, finding fractions in the range 0.0 to 1.0 for each priority until the necessary delta to a width of the line is accumulated, and applying the found fractions to the justification values of the pairs of characters by priority.

10. The program of claim 9, wherein:

the justification values are collected in a table keyed by priority.

11. The program of claim 9, wherein:

justification values for a pair of characters is defined according to respective character classes of the sequentially first and second characters of the pair.

12. The program of claim 11, further comprising instructions to:

receive user input freely defining to any granularity with which the character classes exist and which characters inhabit those classes.

13. A computer program product, tangibly embodied on a machine-readable storage device, comprising instructions operable to cause data processing apparatus to:

receive a definition of character-specific spacing rules for justification, the character-specific spacing rules including one or more character classes, the spacing rules including justification parameters identifying a range for compressing or stretching a particular pair of characters; and apply the character-specific spacing rules for justification so that characters are spaced according to their type design in a font, or characters are spaced according to the character-specific spacing rules, or characters are spaced according to their type design in a font without regard to character-specific spacing rules, or characters are spaced according to both their type design in a font and character-specific spacing rules.

14. The program of claim 13, further comprising instructions to:

receive user input freely defining to any granularity with which the character classes exist and which characters inhabit those classes.

15. A system comprising:

a user interface device; and one or more computers operable to interact with the user interface device and to perform operations including:

receiving a spacing classification file specifying a classification for a Latin-based character set, the classification file being a text file containing in text form multiple character class definitions each defining a character class, each character class definition defining a character class as having one or more arbitrary Latin-based characters, the classification file further containing multiple inter-class spacing rules, in text form, each associated with an ordered pair of character classes, each inter-class spacing rule defining one or more spacing parameters for the ordered pair of character classes;

laying out a line of text comprising a sequence of Latin-based character glyphs derived from a sequence of characters using the inter-class spacing rules, the sequence of characters including one or more characters belonging to different character classes;

if the line of text needs to be compressed to a target line width, compressing the line of text according to the inter-class spacing rules for each of two or more pairs of sequential characters in the sequence of characters, the inter-class spacing rules being defined in the spacing classification file, the inter-class spacing rules identifying a particular compression range for each pair of characters; and if the line of text needs to be stretched to a target line width, decompressing the line of text according to the inter-class spacing rules for each of two or more pairs of sequential characters in the sequence of characters, the inter-class spacing rules being defined in the spacing classification file, the inter-class spacing rules identifying a particular stretching range for each pair of characters.

16. The system of claim 15, where:

the character set includes Arabic numbers, punctuation characters, and diacritical marks; and the inter-class spacing rules have priorities and are applied in stretching or expanding the line of text according to their respective priorities.

17. The system of claim 15, further operable to perform operations comprising:

receiving user input applying the classification to a block of text.

18. A system comprising:
a user interface device; and
one or more computers operable to interact with the user interface device and to perform operations including:
receiving a line of Latin character text for typesetting;
receiving user input defining a character classification and inter-class rules for character spacing and justification, the rules defining spacing parameters and justification parameters independent of font-specific glyph parameters, the rules further defining priorities for application of justification parameters in a justification process, the character classification defining classes including a many-to-one mapping of characters to classes, the rules defining spacing and justification parameters for ordered pairs of the class, each pair of characters in the line of text mapping to a pair of the classes, the user input being unconstrained by the program as to the number of two or more classes or the mapping of characters to classes, and where the justification parameters identify a particular compression or expansion range for each character class pair; and
laying out the line of text in accordance with the character classification and rules.

19. The system of claim 18, further operable to perform operations comprising:
compressing the line of text according to the inter-class justification rules and their respective priorities; and
stretching the line of text according to the inter-class justification rules and their respective priorities.

20. The system of claim 18, further operable to perform operations comprising:
associating a style with a block of text, the style comprising the character classification and inter-class rules.

21. The system of claim 18, further operable to perform operations comprising:
applying the inter-class spacing rules to a first pair of characters in addition to any kerning rules defined by a font for the first pair of characters.

22. The system of claim 18, further operable to perform operations comprising:
applying the inter-class spacing rules to a first pair of characters in place of any kerning rules defined by a font for the first pair of characters.

23. A system comprising:
a user interface device; and
one or more computers operable to interact with the user interface device and to perform operations including:
spacing a line of text comprising a sequence of characters; then
justifying the line of text by stretching or compressing, comprising instructions to collect stretch justification values or compress justification values for each sequential pair of characters in the line by priority, with all justifications of the same priority combined as one value, and starting with the highest priority, finding fractions in the range 0.0 to 1.0 for each priority until the necessary delta to a width of the line is accumulated, and applying the found fractions to the justification values of the pairs of characters by priority.

24. The system of claim 23, where:
the justification values are collected in a table keyed by priority.

25. The system of claim 23, where:
justification values for a pair of characters is defined according to respective character classes of the sequentially first and second characters of the pair.

26. The system of claim 25, further operable to perform operations comprising:
receiving user input freely defining to any granularity with which the character classes exist and which characters inhabit those classes.

27. A system comprising:
a user interface device; and
one or more computers operable to interact with the user interface device and to perform operations including:
receiving a definition of character-specific spacing rules for justification, the character specific spacing rules including one or more character classes, the spacing rules including justification parameters identifying a range for compressing or stretching a particular pair of characters; and
applying the character-specific spacing rules for justification so that characters are spaced according to their type design in a font, or characters are spaced according to the character-specific spacing rules, or characters are spaced according to their type design in a font without regard to character-specific spacing rules, or characters are spaced according to both their type design in a font and character-specific spacing rules.

28. The system of claim 27, further operable to perform operations comprising:
receiving user input freely defining to any granularity with which the character classes exist and which characters inhabit those classes.

29. A method comprising:
receiving a spacing classification file specifying a classification for a Latin-based character set, the classification file being a text file containing in text form multiple character class definitions each defining a character class, each character class definition defining a character class as having one or more arbitrary Latin-based characters, the classification file further containing multiple inter-class spacing rules, in text form, each associated with an ordered pair of character classes, each inter-class spacing rule defining one or more spacing parameters for the ordered pair of character classes;
laying out a line of text comprising a sequence of Latin-based character glyphs derived from a sequence of characters using the inter-class spacing rules, the sequence of characters including one or more characters belonging to different character classes;
if the line of text needs to be compressed to a target line width, compressing the line of text according to the inter-class spacing rules for each of two or more pairs of sequential characters in the sequence of characters, the inter-class spacing rules being defined in the spacing classification file, the inter-class spacing rules identifying a particular compression range for each pair of characters; and
if the line of text needs to be stretched to a target line width, decompressing the line of text according to the inter-class spacing rules for each of two or more pairs of sequential characters in the sequence of characters, the inter-class spacing rules being defined in the spacing classification file, the inter-class spacing rules identifying a particular stretching range for each pair of characters.

30. The method of claim 29, where:
the character set includes Arabic numbers, punctuation characters, and diacritical marks; and
the inter-class spacing rules have priorities and are applied in stretching or expanding the line of text according to their respective priorities.

31. The method of claim 29, further comprising:
receiving user input applying the classification to a block of text.

32. A method comprising:
receiving a line of Latin character text for typesetting;
receiving user input defining a character classification and inter-class rules for character spacing and justification, the rules defining spacing parameters and justification parameters independent of font-specific glyph parameters, the rules further defining priorities for application of justification parameters in a justification process, the character classification defining classes including a many-to-one mapping of characters to classes, the rules defining spacing and justification parameters for ordered pairs of the class, each pair of characters in the line of text mapping to a pair of the classes, the user input being unconstrained by the program as to the number of two or more classes or the mapping of characters to classes, and where the justification parameters identify a particular compression or expansion range for each character class pair; and
laying out the line of text in accordance with the character classification and rules.

33. The method of claim 32, further comprising:
compressing the line of text according to the inter-class justification rules and their respective priorities; and
stretching the line of text according to the inter-class justification rules and their respective priorities.

34. The method of claim 32, further comprising:
associating a style with a block of text, the style comprising the character classification and inter-class rules.

35. The method of claim 32, further comprising:
applying the inter-class spacing rules to a first pair of characters in addition to any kerning rules defined by a font for the first pair of characters.

36. The method of claim 32, further comprising:
applying the inter-class spacing rules to a first pair of characters in place of any kerning rules defined by a font for the first pair of characters.

37. A method comprising:
spacing a line of text comprising a sequence of characters; then
justifying the line of text by stretching or compressing, comprising instructions to collect stretch justification values or compress justification values for each sequential pair of characters in the line by priority, with all justifications of the same priority combined as one value, and starting with the highest priority, finding fractions in the range 0.0 to 1.0 for each priority until the necessary delta to a width of the line is accumulated, and applying the found fractions to the justification values of the pairs of characters by priority.

38. The method of claim 37, where:
the justification values are collected in a table keyed by priority.

39. The method of claim 37, where:
justification values for a pair of characters is defined according to respective character classes of the sequentially first and second characters of the pair.

40. The method of claim 39, further comprising:
receiving user input freely defining to any granularity with which the character classes exist and which characters inhabit those classes.

41. A method comprising:
receiving a definition of character-specific spacing rules for justification, the character specific spacing rules including one or more character classes, the spacing rules including justification parameters identifying a range for compressing or stretching a particular pair of characters; and
applying the character-specific spacing rules for justification so that characters are spaced according to their type design in a font, or characters are spaced according to the character-specific spacing rules, or characters are spaced according to their type design in a font without regard to character-specific spacing rules, or characters are spaced according to both their type design in a font and character-specific spacing rules.

42. The method of claim 41, further comprising:
receiving user input freely defining to any granularity with which the character classes exist and which characters inhabit those classes.

* * * * *

UNITED STATES PATENT AND TRADEMARK OFFICE
CERTIFICATE OF CORRECTION

| | |
|---|---|
| PATENT NO. | : 7,594,171 B2 |
| APPLICATION NO. | : 10/956744 |
| DATED | : September 22, 2009 |
| INVENTOR(S) | : Menninga |

It is certified that error appears in the above-identified patent and that said Letters Patent is hereby corrected as shown below:

On the Title page,

[*] Notice: Subject to any disclaimer, the term of this patent is extended or adjusted under 35 U.S.C. 154(b) by 807 days.

Delete the phrase "by 807 days" and insert -- by 1039 days --

Signed and Sealed this

Seventeenth Day of August, 2010

David J. Kappos
*Director of the United States Patent and Trademark Office*